(12) United States Patent
Kim et al.

(10) Patent No.: US 8,399,120 B2
(45) Date of Patent: Mar. 19, 2013

(54) BATTERY MODULE

(75) Inventors: Jun-Sik Kim, Yongin-si (KR);
Man-Seok Han, Yongin-si (KR);
Tae-Keun Kim, Yongin-si (KR);
Sung-Soo Kim, Yongin-si (KR);
Sae-Weon Roh, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 268 days.

(21) Appl. No.: 12/843,825

(22) Filed: Jul. 26, 2010

(65) Prior Publication Data
US 2011/0052965 A1 Mar. 3, 2011

(30) Foreign Application Priority Data
Sep. 1, 2009 (KR) .................. 10-2009-0082173

(51) Int. Cl.
*H01M 10/50* (2006.01)
*H01M 2/08* (2006.01)

(52) U.S. Cl. ........ 429/120; 429/151; 429/155; 429/163; 429/176; 429/185

(58) Field of Classification Search .......... 429/120, 429/151, 152, 153, 154, 155, 156, 163, 176, 429/185, 186
See application file for complete search history.

(56) References Cited

U.S. PATENT DOCUMENTS

| | | | | |
|---|---|---|---|---|
| 629,325 | A * | 7/1899 | Ashley | 429/153 |
| 2,591,355 | A * | 4/1952 | Heraud | 429/90 |
| 2,632,781 | A * | 3/1953 | Woodring | 429/155 |
| 2,658,936 | A * | 11/1953 | Rock | 429/153 |
| 2,677,716 | A * | 5/1954 | MacFarland | 429/154 |
| 3,475,220 | A * | 10/1969 | Knorr | 429/104 |
| 3,488,221 | A * | 1/1970 | Shimotake et al. | 429/103 |
| 5,053,294 | A * | 10/1991 | Sernka et al. | 429/104 |
| 5,162,172 | A * | 11/1992 | Kaun | 429/155 |
| 5,219,673 | A * | 6/1993 | Kaun | 429/458 |
| 5,916,709 | A * | 6/1999 | Arias et al. | 429/210 |
| 8,057,933 | B2 * | 11/2011 | Miyahisa et al. | 429/185 |
| 2004/0175609 | A1 * | 9/2004 | Yageta et al. | 429/82 |

FOREIGN PATENT DOCUMENTS

| | | |
|---|---|---|
| JP | 08-298103 | 11/1996 |
| JP | 2002-339667 | 11/2002 |
| JP | 2008-282639 | 11/2008 |
| KR | 10-2004-0110597 | 12/2004 |
| KR | 10-2007-0075941 | 7/2007 |
| KR | 10-2008-0082240 | 9/2008 |

* cited by examiner

*Primary Examiner* — Robert B Davis
(74) *Attorney, Agent, or Firm* — Knobbe Martens Olson & Bear LLP (57) ABSTRACT

A battery module includes a plurality of rechargeable batteries, each rechargeable battery including a case having an opening at one side and an electrode assembly inserted inside the case; and a sealing layer disposed between an opening of at least one case and a case of a neighboring rechargeable battery, wherein the opening of the at least case is covered by the case of the neighboring rechargeable battery.

16 Claims, 14 Drawing Sheets

BATTERY MODULE

RELATED APPLICATIONS

This application claims priority to and the benefit of Korean Patent Application No. 10-2009-0082173 filed in the Korean Intellectual Property Office on Sep. 1, 2009, the entire contents of which are incorporated herein by reference.

BACKGROUND

1. Field

The described technology relates generally to a battery module. More particularly, the described technology relates generally to a rechargeable battery with an improved case structure inserted with an electrode assembly.

2. Description of the Related Art

Unlike primary batteries that cannot be recharged, a rechargeable battery (i.e., a secondary battery or a secondary cell) can be repeatedly charged and discharged. A low-capacity rechargeable battery is commonly used for small portable electronic devices such as mobile phones, notebook computers, camcorders, and the like, and a large-capacity battery is commonly used as a power source for driving motors of a hybrid electric vehicle and the like.

A high-power rechargeable battery using non-aqueous electrolyte with high energy density has been recently developed. For example, the high-power rechargeable battery is constructed with a high-capacity rechargeable battery having a plurality of rechargeable cells coupled to each other in series such that it can be used as a power supply for driving motors in electric vehicles requiring high power.

As stated, high-capacity rechargeable batteries are commonly formed with a plurality of rechargeable cells coupled to each other in series. The rechargeable battery may have a cylindrical shape or a prismatic shape.

The conventional rechargeable battery typically includes an electrode assembly with positive and negative electrodes and a separator interposed between the two electrodes, a case mounting the electrode assembly therein, a cap plate fitted and sealed to the case and having terminal holes, and terminals inserted into the terminal holes of the cap plate and protruded to the outside of the case.

Among the conventional rechargeable batteries, a lithium ion battery is particularly used as a small mobile battery. It is also mainly uses a small metal can or a film pouch as exterior materials, and induces a solid sealing structure through welding or melting for isolation between the inside and outside of the battery. However, when the rechargeable battery is developed as a medium-sized battery for electric vehicles such as an HEV, a PHEV, an EV, or a power storage unit, the conventional small battery is not appropriate to be a part of the medium-sized battery system because of high current and high voltage, such that improvements thereof are required.

Upon developing the large capacity battery system, it is preferable that the battery is managed as a system of the battery module with a capacity of more than several tens of Ah (Ampere-hours) or several hundreds of Ah, outside the concept of the single cell. When the conventional small battery is included in the large capacity battery system, the number of cells is increased such that it is difficult to compose and manage the system, and cost is increased.

Accordingly, it is easy to compose the battery module for realizing the medium-sized battery system, and a battery exterior with reliability is necessary.

The above information is only for enhancement of understanding of the background of the described technology and therefore may contain information that does not form the prior art that is already known in this country to a person of ordinary skill in the art.

SUMMARY

A battery module according to an embodiment of the present invention includes: a plurality of rechargeable batteries, each rechargeable battery including a case having an opening at one side and an electrode assembly inserted inside the case; and a sealing layer disposed between the opening of at least one case and the case of a neighboring rechargeable battery, wherein the opening of the at least one case is covered by the case of the neighboring rechargeable battery.

Each case may include a mounting groove in which the electrode assembly is mounted and an upper flange extended outside of the opening thereby contacting the case of the neighboring rechargeable battery, and the upper flange may have a coupling hole in which a fixing member supporting the neighboring rechargeable batteries is inserted.

A spacer between upper flanges of neighboring rechargeable batteries and supported by the fixing member between the upper flanges of the neighboring rechargeable batteries may be further included, and the spacer may be made of an elastic material.

The upper flange may have a step in which the sealing layer is inserted at a portion contacting the mounting groove, and the case may have a lower flange inserted at a step formed at the case of the neighboring rechargeable battery and contacting the sealing layer.

The sealing layer may be made of a gasket, and the gasket may have one cross-section selected from a circular, a quadrangular, and a wrinkle shape. The gasket may have a hollow cross-section, and at least one surface of the gasket may have a protrusion.

The gasket may include a supporting member and a polymer layer coated on the surface of the supporting member, wherein the gasket is more elastic than the supporting member, and the mounting groove may be inclined so that a surface area of a bottom of the mounting groove is smaller area than that of the opening, and the sealing layer may be formed between the opening of the mounting groove and the outer surface of the mounting groove of the neighboring case.

The bottom of the mounting groove may be inserted into the mounting groove of a neighboring rechargeable battery, the electrode assembly may include an anode and a cathode and a separator disposed between the anode and the cathode, and one electrode of the anode and the cathode may be electrically connected to the bottom of the case while the other electrode may be electrically connected to the lower surface of the neighboring case.

A battery module according to another embodiment of the present invention includes: a plurality of rechargeable batteries, each rechargeable battery including a case having an opening formed on opposite surfaces facing each other, and an electrode assembly inserted into the case; and a plurality of gasket members inserted between adjacent cases and covering the opening of each of the rechargeable batteries.

The case may be made of a hollow bar with a space inside, and a coolant may be supplied into the space inside of the hollow bar.

According to an embodiment of the present invention, the battery module may be manufactured, and when only a portion of the rechargeable battery is faulty, replacement and repairs of the faulty portion may be easy.

BRIEF DESCRIPTION OF THE DRAWINGS

The above and other features and advantages will become more apparent to those of ordinary skill in the art by describing in detail embodiments with reference to the attached drawings, in which.

DESCRIPTION OF REFERENCE NUMERALS INDICATING PRIMARY ELEMENTS IN THE DRAWINGS

| | |
|---|---|
| 10: electrode assembly | 100: battery module |
| 11: anode | 12: cathode |
| 13: separator | 20: case |
| 23: upper flange | 24: step |
| 25: mounting groove | 27: coupling hole |
| 28: lower flange | 30: rechargeable battery |
| 31: anode terminal | 32: cathode terminal |
| 35: gasket | 41: spacer |
| 45: fixing member | 51, 52: end plate |

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention. Like reference numerals designate like elements throughout the specification.

Figure 1:
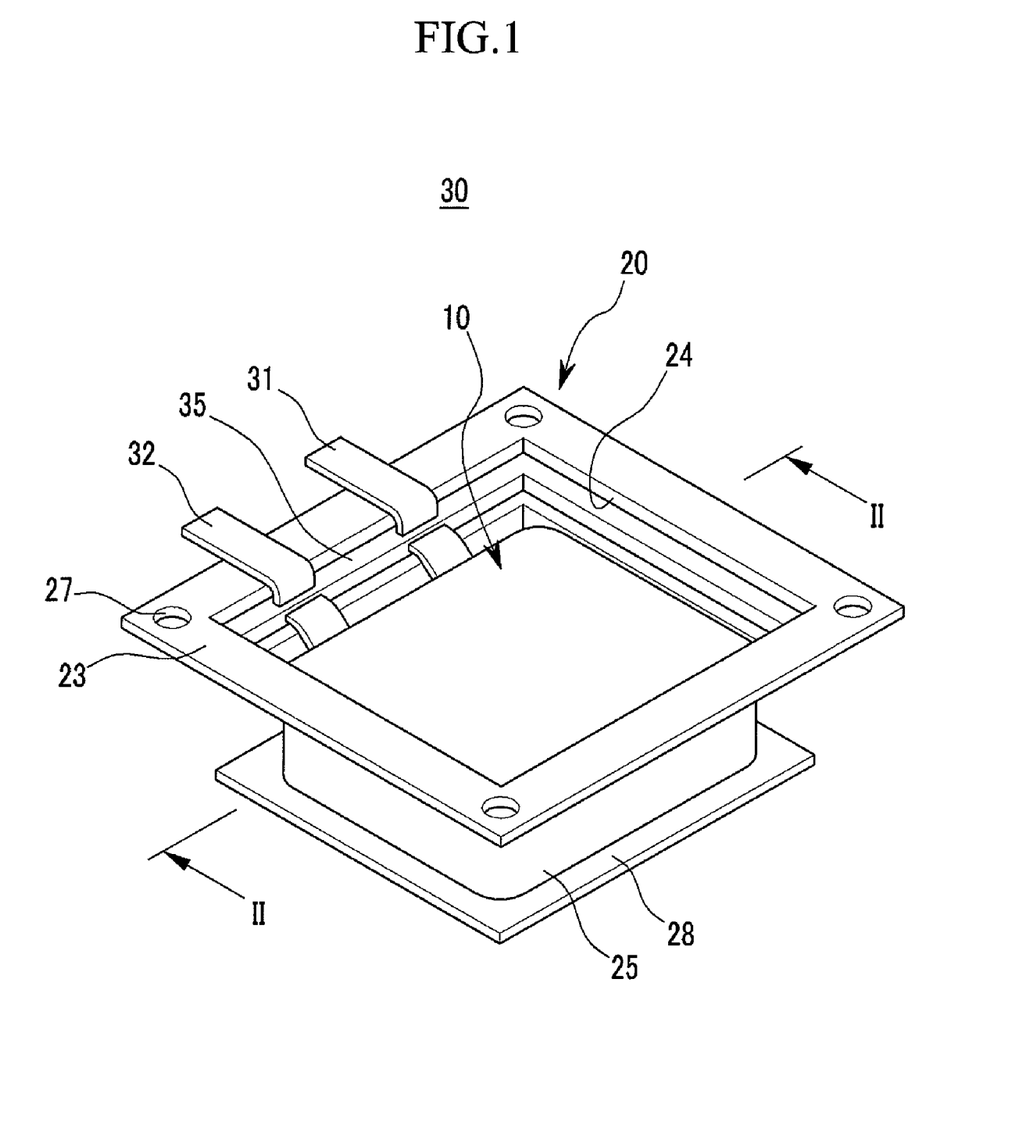
FIG. 1 is a perspective view of a rechargeable battery according to a first embodiment of the present invention.
Figure 2:
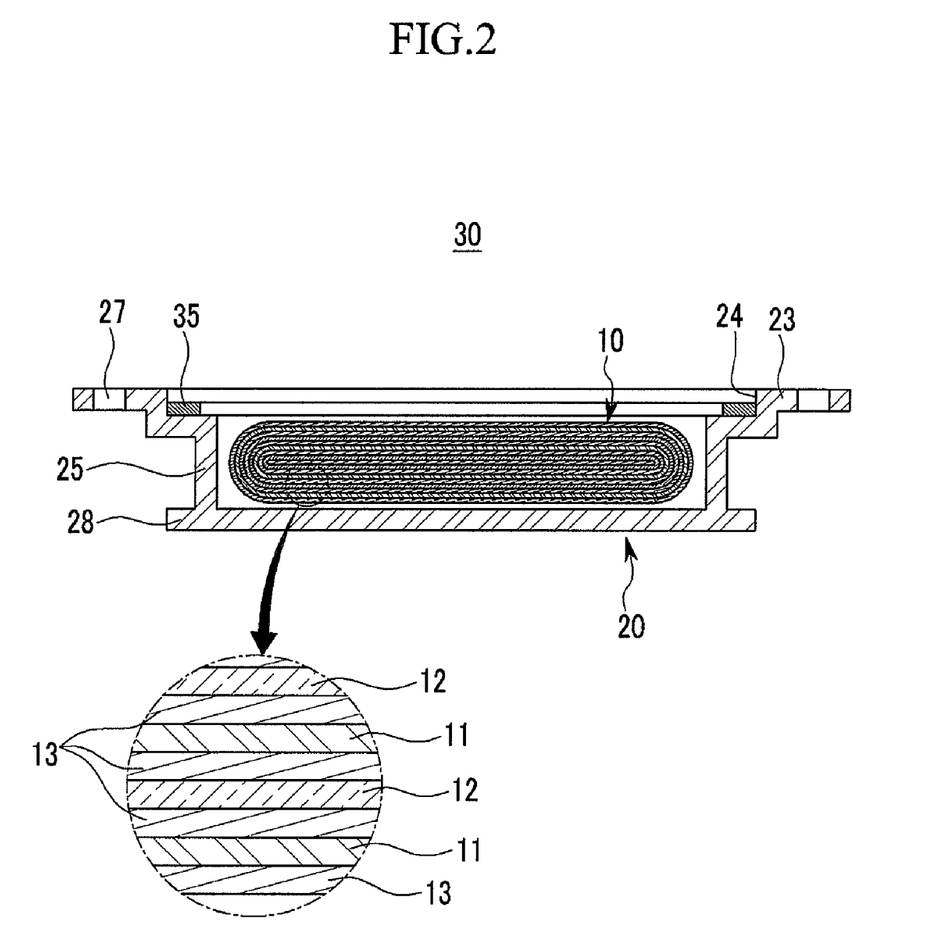
FIG. 2 is a cross-sectional view taken along the line II-II shown in FIG. 1.

FIG. 1 is a perspective view of a rechargeable battery according to a first embodiment of the present invention, and FIG. 2 is a cross-sectional view taken along the line II-II shown in FIG. 1.

Referring to FIG. 1 and FIG. 2, a rechargeable battery 30 according to the first embodiment may include an electrode assembly 10 having an anode 11 and a cathode 12 and a separator 13 interposed therebetween, a case 20 mounted with the electrode assembly 10, and an anode terminal 31 and a cathode terminal 32 electrically connected to the electrode assembly 10. The rechargeable battery 30 according to the first embodiment is described as an example of a lithium-ion rechargeable battery.

The anode 11 may be made of a structure in which a positive active material is coated on an anode current collector, and the cathode 12 may be made of a structure in which an negative active material is coated on a cathode current collector. The electrode assembly 10 may be formed by spiral-winding the positive and negative electrodes 11 and 12 having a band shape while interposing the separator 13 therebetween. However, the present invention is not limited thereto, and the electrode assembly may have a structure in which a plurality of anodes 11 and cathodes 12 are deposited via the separator 13 interposed therebetween.

The case 20 may include a mounting groove 25 mounted with the electrode assembly 10, and an upper flange 23 extended upward at the upper portion of the mounting groove 25. The mounting groove 25 may have a cross-section of an approximate quadrangle, and be disposed on the central part of the case 20. The case 20 may be formed with a sheet shape, and the mounting groove 25 may be formed by curving the case of the sheet shape.

The upper flange 23 may be continuously formed according to the circumference of the mounting groove 25, and a coupling hole 27 may be formed on the edge of the upper flange 23. Also, the upper flange 23 may have a step 24 that is inserted with a gasket 35 at the portion that contacts the mounting groove 25. The step 24 may have a structure that is concave toward the bottom at the upper flange 23, and the bottom of the step 24 is lower than the upper flange 23 and higher than the bottom of the mounting groove 25.

The step 24 may be continuously formed according to the circumference of the mounting groove 25, and the gasket 35 of a ring shape may be inserted to the step. The gasket 35 may be made of a material having elasticity, and include a sealing layer closing and sealing the case 20. The anode terminal 31 and the cathode terminal 32 may pass through the gasket 35 and protrude to the outside.

In the present embodiment, as the sealing layer, the gasket 35 may be installed at the step, however the present invention is not limited thereto, and an adhesion layer may be added as well as the gasket 35.

A lower flange 28 that is expanded from the bottom to the outside may be formed at the bottom of the case 20. The lower flange 28 may be continuously formed according to the circumference of the bottom of the case 20, and be disposed parallel to the upper flange 23.

Figure 3:
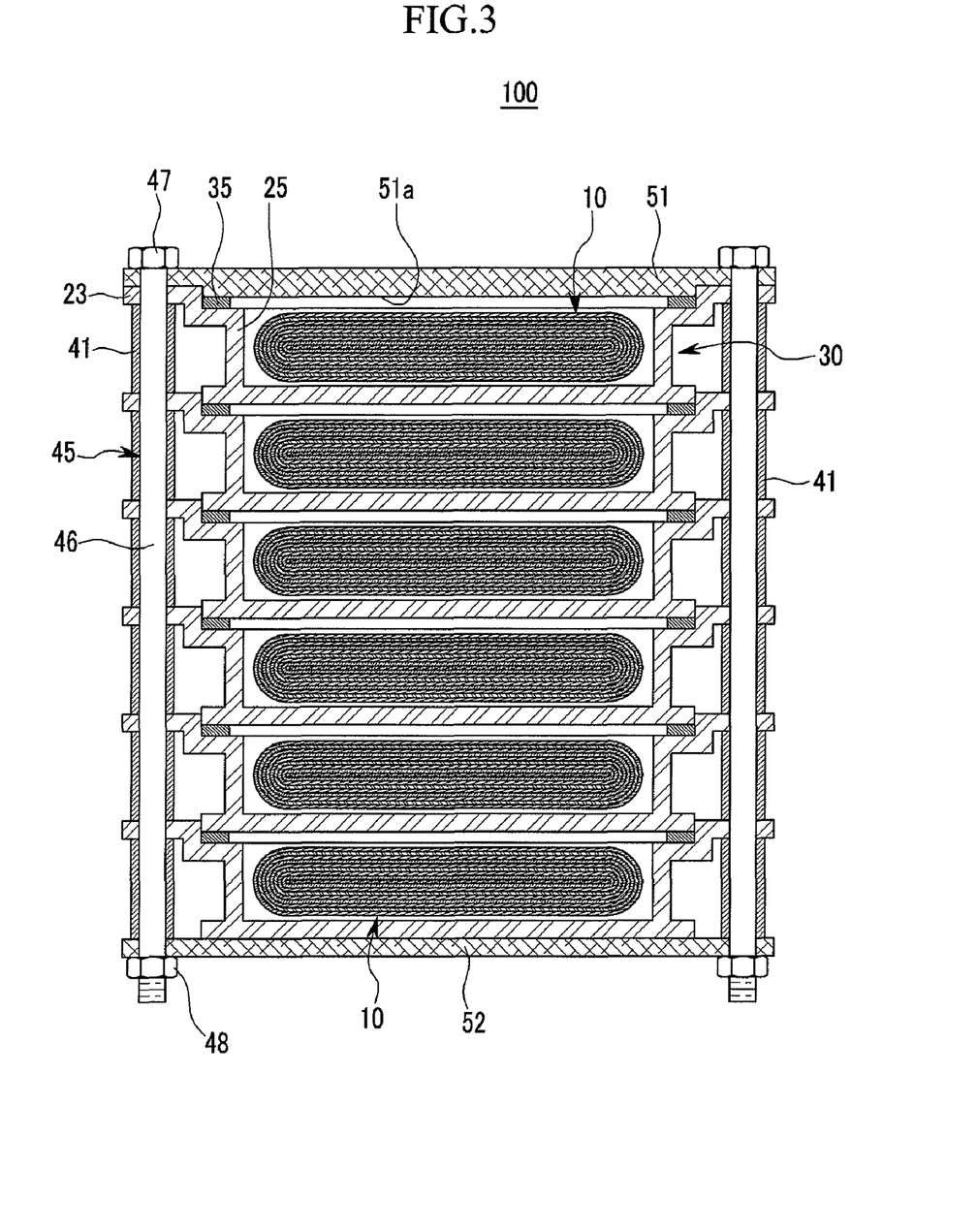
FIG. 3 is a cross-sectional view of a battery module according to the first embodiment of the present invention.

FIG. 3 is a cross-sectional view of a battery module according to the first embodiment of the present invention.

Referring to FIG. 3, a battery module 100 according to the present embodiment may include a plurality of rechargeable batteries 30 that are disposed and arranged, end plates 51 and 52 installed at the outermost sides of the rechargeable batteries 30, and a fixing member 45 passing through the case 20 of the rechargeable battery 30 and the end plates 51 and 52 and coupled thereto.

The rechargeable batteries 30 may be disposed with a structure in which the lower flange 28 of the rechargeable battery of the other side is inserted to the step 24 of the rechargeable battery 30 of one side, and the lower flange 28 meets the gasket 35.

If the lower flange 28 and the gasket 35 are close to each other, the rechargeable battery 30 may be stably closed and sealed, and it is not necessary for an additional cover plate to be installed such that the weight may be reduced.

The fixing member 45 may be installed while passing through the coupling holes 27 of the cases 20 and the end plates 51 and 52. The fixing member 45 may include a coupling rod 46 having a head unit 47 formed at one end and a nut 48 coupled at the opposite end. The fixing member 45 can press the cases 20 to put pressure on the gasket 35, and thereby the upper flange 23, the gasket 35, and the lower flange of the neighboring rechargeable battery may be closed and sealed to each other.

Further, a spacer 41 may be installed between the upper flange 23 of the case 20, and it has a hollow structure for the coupling rod 46 to be inserted therethrough. Also, to apply sufficient pressure to the gasket 35, the spacer 41 may have lesser height than the interval between the upper flanges 23. If the length of the spacer 41 is less than the interval of the upper flanges 23 by several mm to the several cm, the case 20 may be prevented from being deformed when sufficient pressure is applied to the gasket 35. Also, the spacer 41 may be made of metal, and may be made of an elastic member having a predetermined intensity.

The end plates 51 and 52 may be respectively installed at the upper and lower portions of the battery module 100, such that one end plate 52 is close to the bottom of the case 20 and the other end plate 51 covers the opening of the case 20.

The end plate 51 that is coupled to the opening of the case 20 may have a cover protrusion 51a inserted in the step 24 of the case 20. The cover protrusion 51a may be closely adhered to the gasket 35, thereby having a function of closing and sealing the uppermost case 20.

According to the present embodiment, a cover is not installed to the case 20, and the rechargeable battery 30 may be easily closed and sealed by the coupling of the gasket 35 and the cases 20. Accordingly, the volume and the weight of the battery module 100 may be reduced, the manufacturing may be easy, and the product cost may be reduced. Also, when only a portion of the rechargeable battery 30 is deteriorated, the replacement and repair of the rechargeable battery 30 are easy.

Figure 4A:
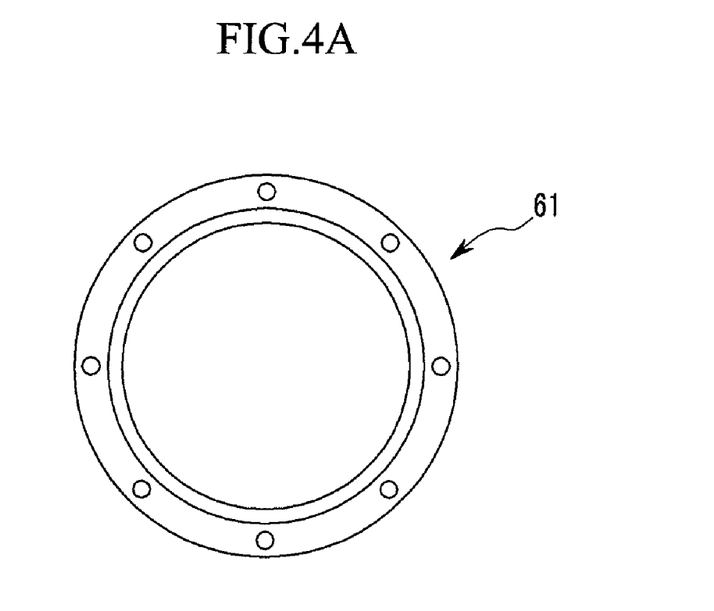
FIG. 4A and FIG. 4B are top plan views showing a case according to variations of the first embodiment of the present invention.
Figure 4B:
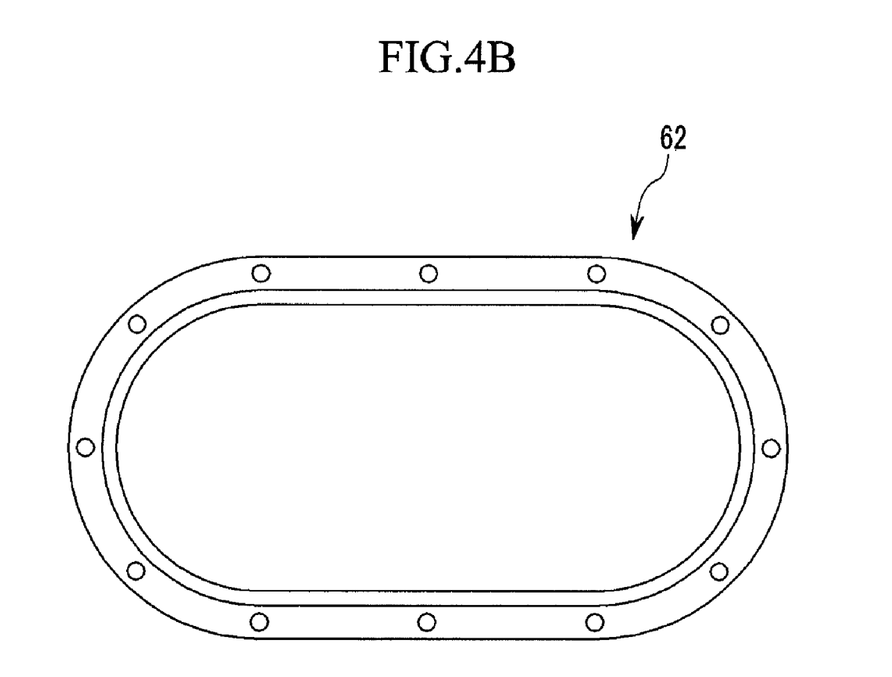

FIG. 4A and FIG. 4B are top plan views showing a case according to variations of the first embodiment of the present invention.

Referring to FIG. 4A and FIG. 4B, as shown in FIG. 4A, a case 61 may have a circular cross-section, and as shown in FIG. 4B, the case 62 may have an oval cross-section.

Figure 5A:
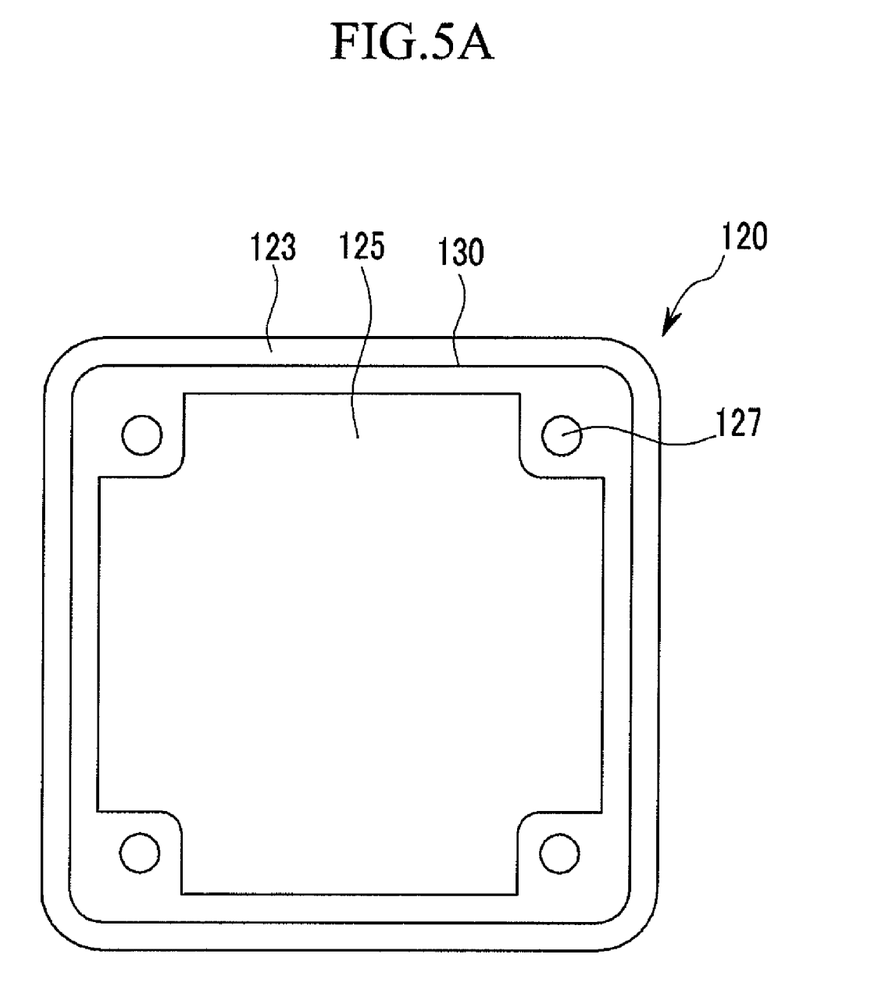
FIG. 5A is a top plan view showing a case according to a variation of the first embodiment of the present invention.
Figure 5B:
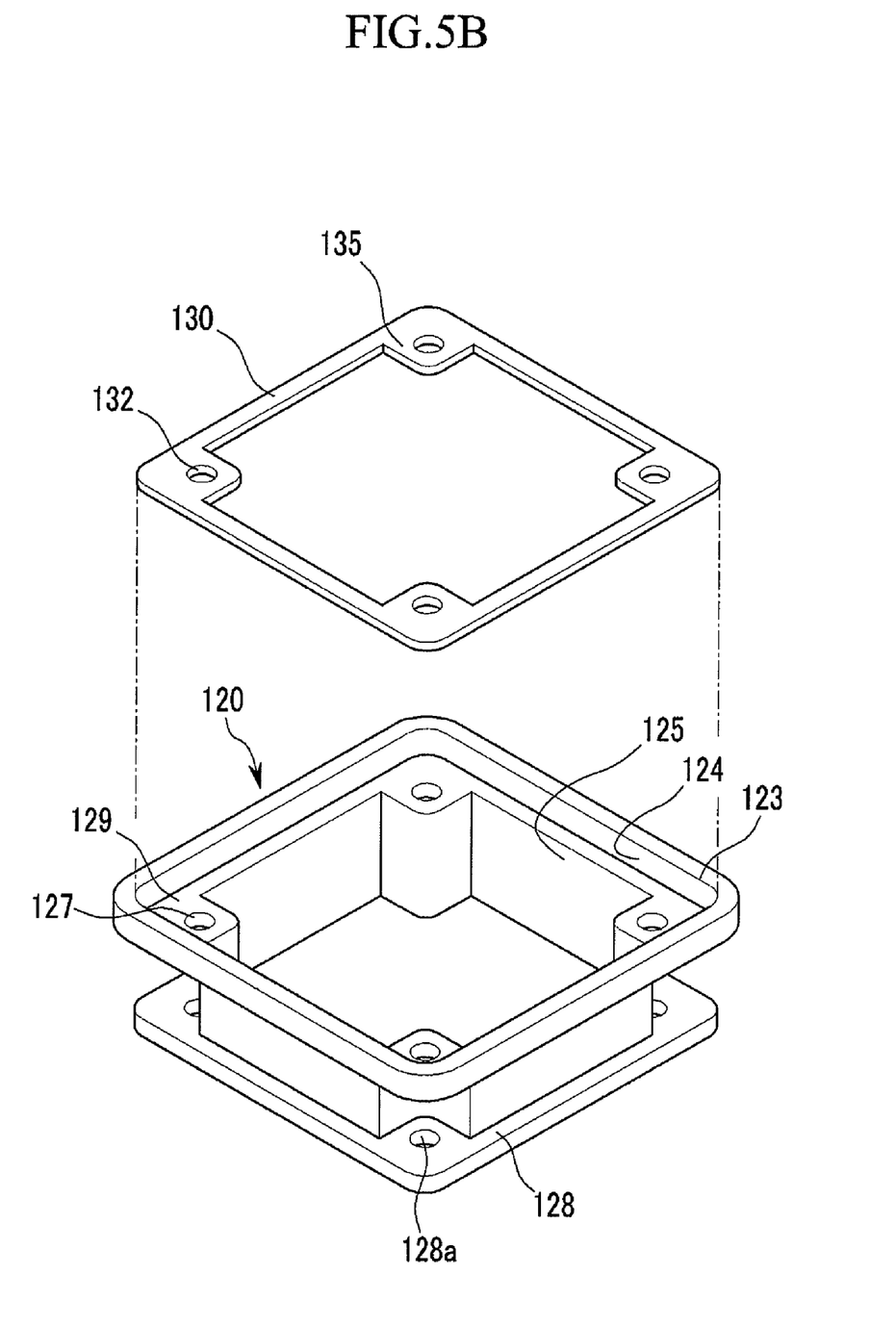
FIG. 5B is a perspective view showing a case and a gasket shown in FIG. 5A.

FIG. 5A is a top plan view showing a case according to a variation of the first embodiment of the present invention, and FIG. 5B is a perspective view showing a case and a gasket shown in FIG. 5A.

Referring to FIG. 5A and FIG. 5B, the case 120 according to the present embodiment includes a mounting groove 125 mounted with the electrode assembly, an upper flange 123 extended in the side direction on the upper portion of the mounting groove 125, and a lower flange 128 extended in the side direction at the bottom of the mounting groove 125. The mounting groove 125 may have a structure that is opened upward.

A step 124 may be formed between the mounting groove 125 and the upper flange 123, and an edge expansion 129 having the wider area than the circumference and extended inside of the mounting groove 125 may be formed on the edge of the step 124. In the edge expansion 129, a coupling hole 127 in which the fixing member is inserted may be formed.

The edge expansion 129 may be formed at the step 124 such that the mounting groove 125 disposed under the step 124 is made of a shape in which four edges are protruded inward. The lower flange 128 of the neighboring case 120 may be inserted in the step 124, and a coupling hole 128a may also be formed at the edge of the lower flange 128.

Also, a gasket 130 may be inserted in the step 124, the gasket 130 may have a square ring shape, and an edge expansion 135 having a wider area than the circumference may be formed at the edge. A coupling hole 132 into which a fixing member is inserted may be formed at the edge expansion 135.

Accordingly, a supporting member may be coupled by passing through the gasket 130, the step 124, and the lower flange 128.

In the present embodiment, if the coupling hole 127 is not formed at the upper flange 123 but formed at the step 124, the upper flange 123 may be formed to be small such that the volume of the battery module may be reduced.

Also, step 124 may be connected to the mounting groove 125 and the upper flange 123 such that step 124 is changed to be small compared with the upper flange 123, and accordingly the pressure from the fixing member may be stably supported. Also, the gasket may be widely formed at the edge where the pressure is concentrated such that the applied pressure may be stably dispersed.

FIG. 6A to FIG. 6F are cut-away perspective views showing a gasket according to a variation according to the first embodiment of the present invention.

Figure 6A:
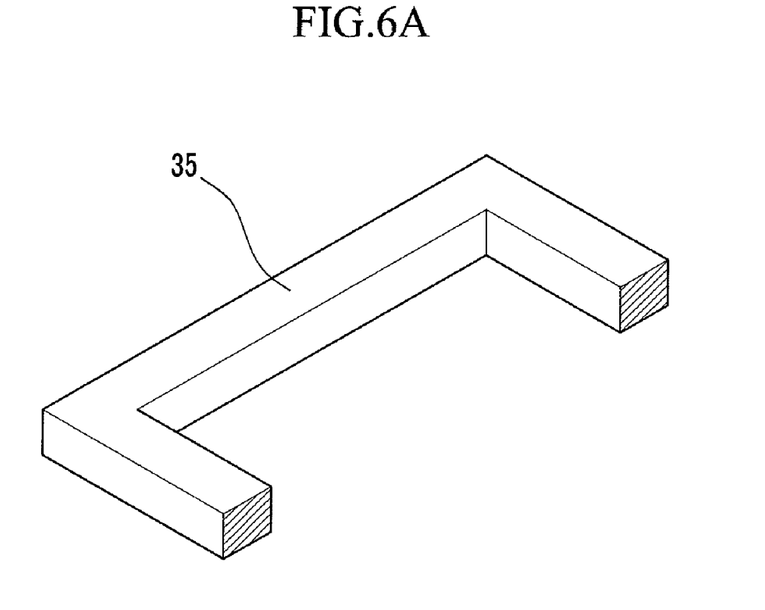
FIG. 6A to FIG. 6F are cut-away perspective views showing a gasket according to a variation according to the first embodiment of the present invention.
Figure 6B:
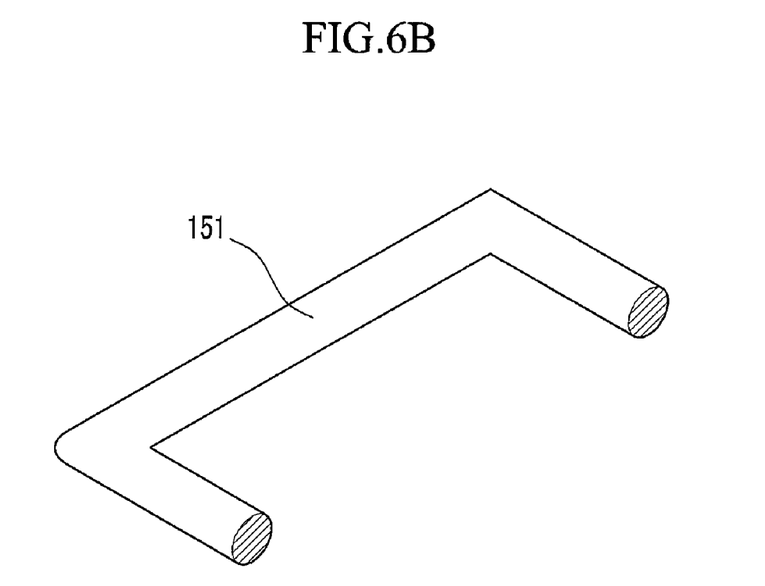
Figure 6C:
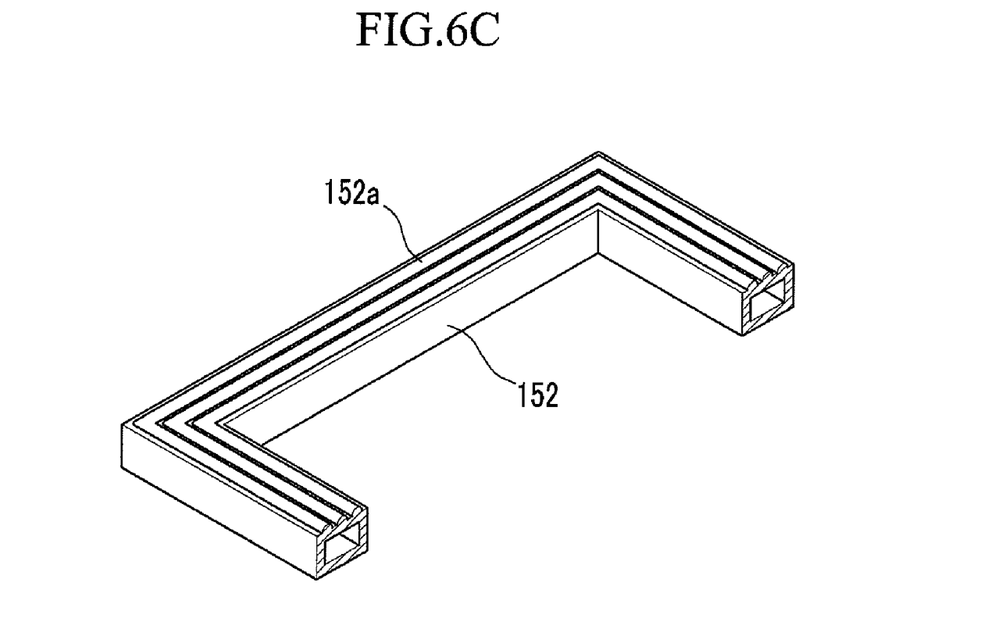
Figure 6D:
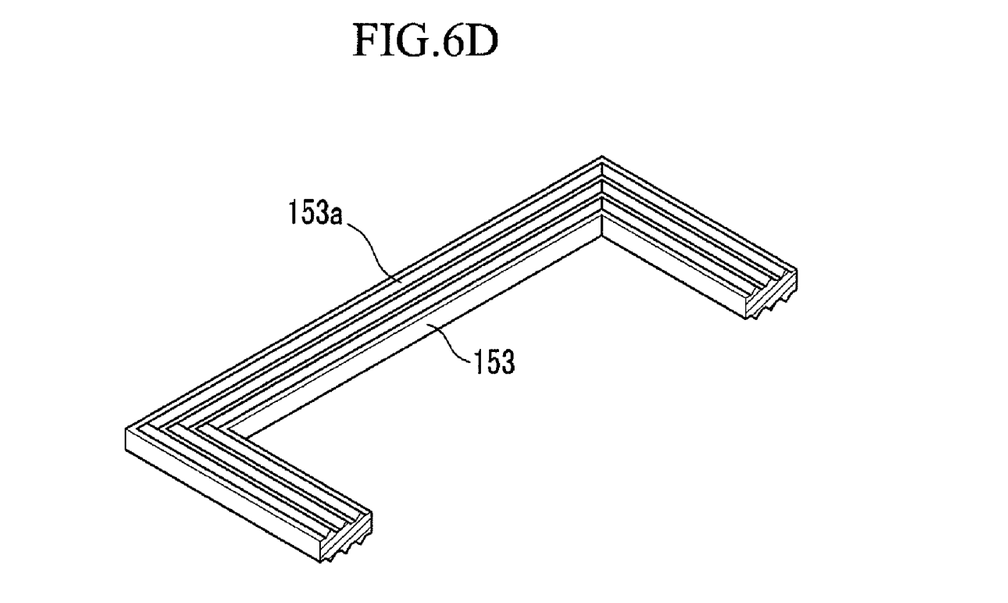

As shown in FIG. 6A, the gasket 35 may have a quadrangular cross-section, and as shown in FIG. 6B, the gasket 151 may have a circular cross-section. Also, as shown in FIG. 6C, the gasket 152 may have a hollow structure where the inner portion is empty and a protrusion 152a may be formed on the upper surface thereof, and as shown in FIG. 6D, the gasket 153 may have a quadrangular plate shape and a protrusion 153a may be formed on the upper and lower surfaces thereof. The protrusion 153a formed at the gasket 153 may be continuously formed according to the length direction of the gasket 153.

Figure 6E:
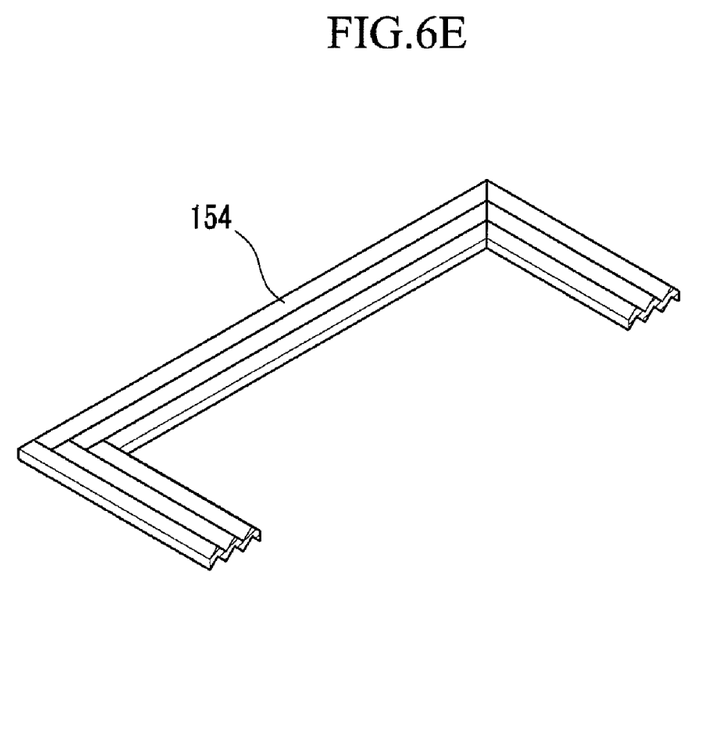
Figure 6F:
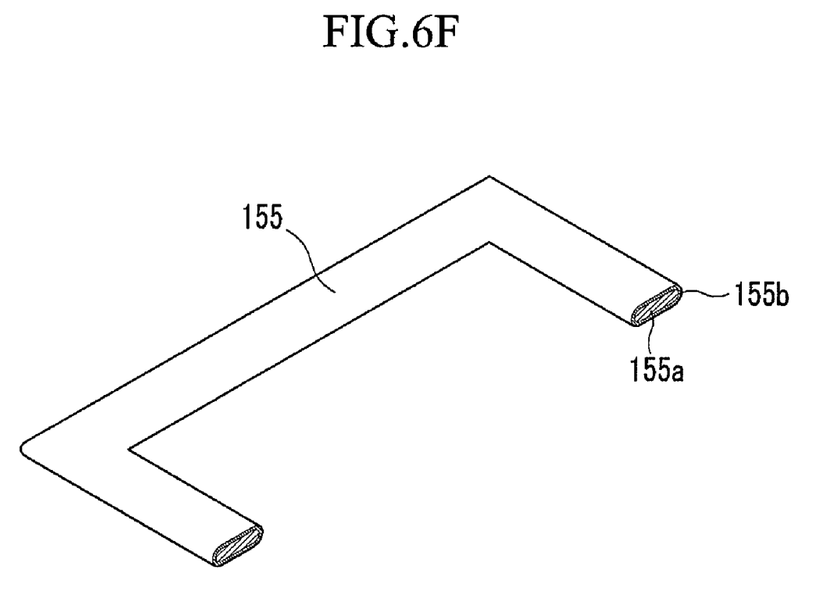

Also, as shown in FIG. 6E, the gasket 154 may have a wrinkle shape, and as shown in FIG. 6F, the gasket 155 may include a supporting member 155a made of a solid material of metal or a polymer, and a polymer layer 155b coated on the surface and having greater elasticity than the supporting member 155a.

Figure 7:
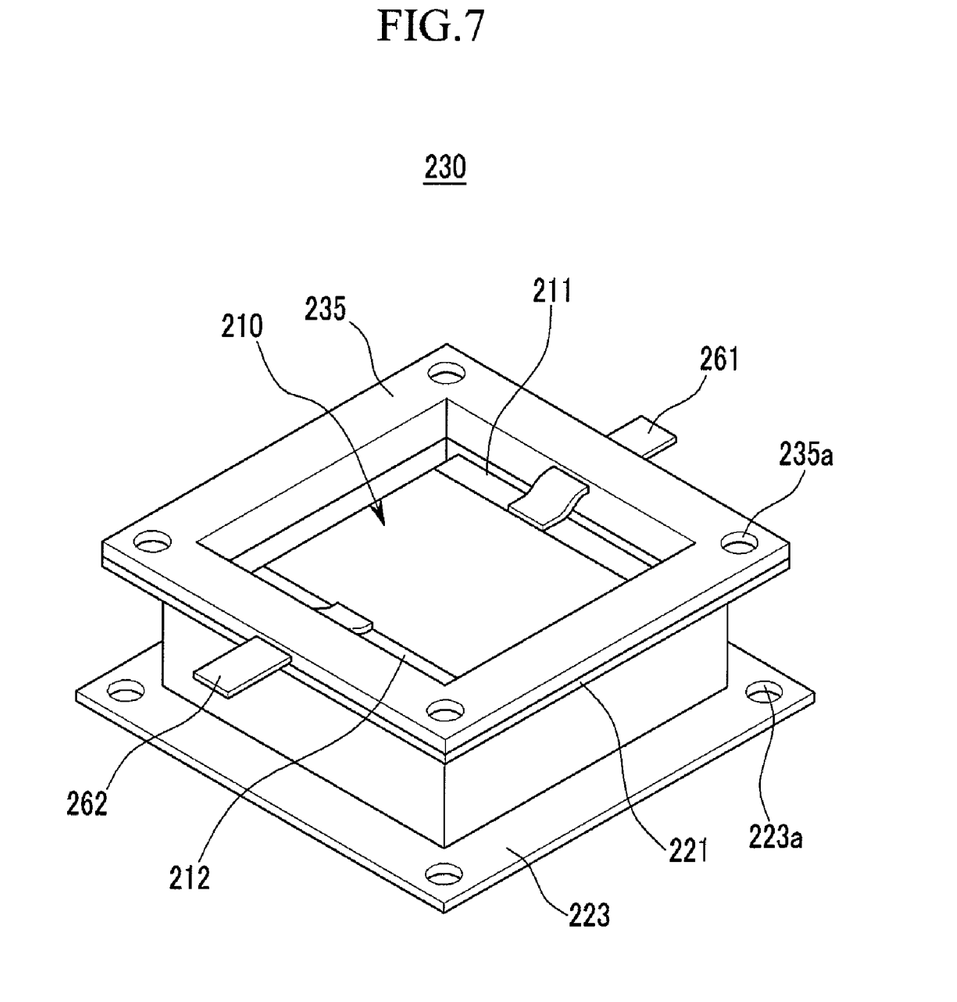
FIG. 7 is a perspective view of a rechargeable battery according to a second embodiment of the present invention.
Figure 8:
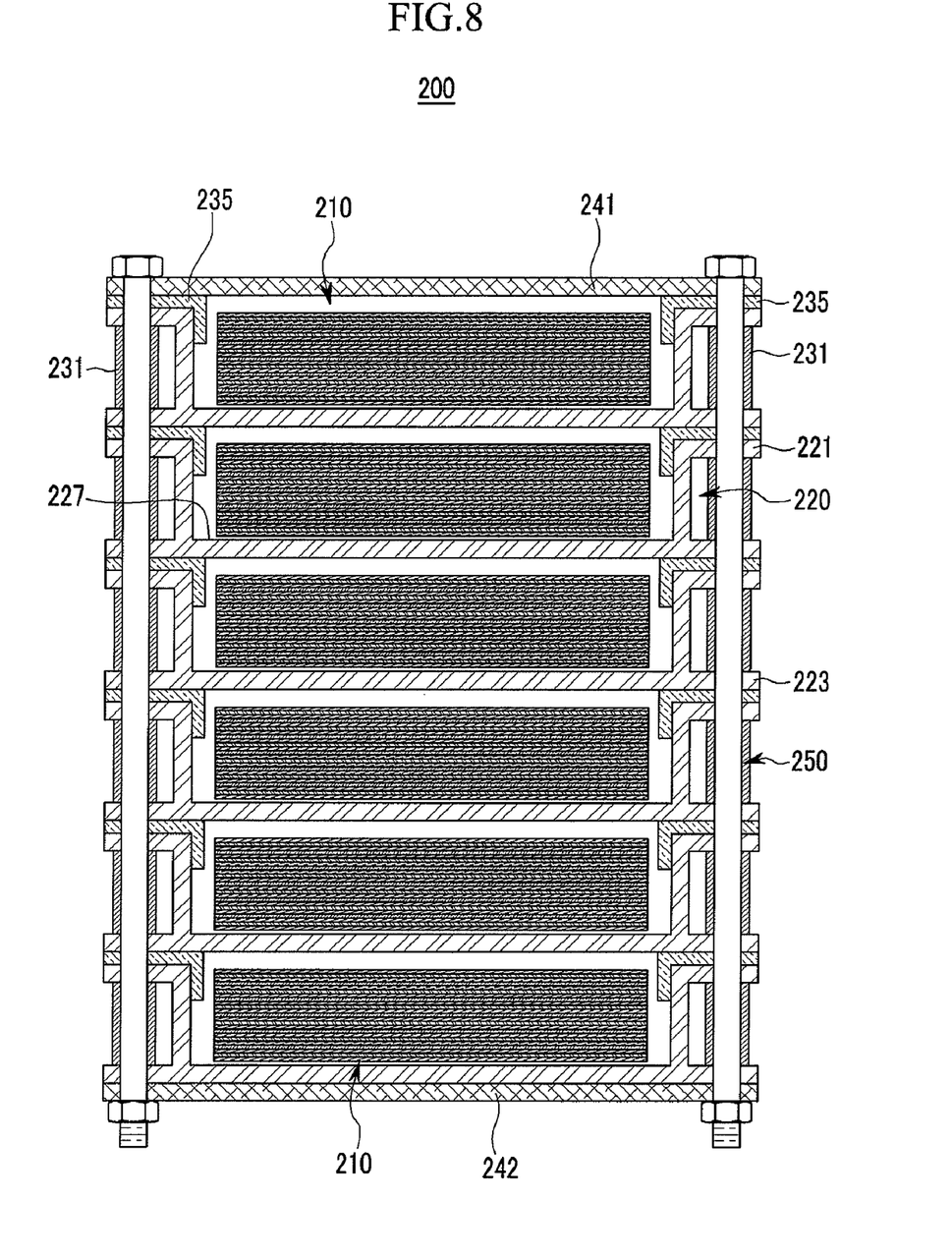
FIG. 8 is a cross-sectional view of a battery module according to the second embodiment of the present invention.

FIG. 7 is a perspective view of a rechargeable battery according to the second embodiment of the present invention, and FIG. 8 is a cross-sectional view of a battery module according to the second embodiment of the present invention.

Referring to FIG. 7 and FIG. 8, a battery module 200 according to the present embodiment may include a plurality of rechargeable batteries 230 including a case 220 and a electrode assembly 210 inserted in the case 220, a gasket 235 interposed between the rechargeable batteries 230, end plates 241 and 242 installed at the outmost side of the rechargeable batteries 230 that are disposed and arranged, and a fixing member 250 passing through the case 220 and the end plates 241 and 242.

The electrode assembly 210 may have a plurality of anodes 211 and cathodes 212 deposited via a separator interposed therebetween, and an uncoated region at which an active material is not formed in the anode and the cathode is respectively formed at the end on the opposite side to the electrode assembly. Also, the anode 211 and the cathode 212 are electrically connected with terminals 261 and 262, and the terminals 261 and 262 are passed through the gasket 235 and are protruded at the opposite side of the case 220. In the present embodiment, the terminal is passed through the gasket and is protruded, however the present invention is not limited thereto, and the terminals 261 and 262 may be protruded outside through a hole formed in the case 220.

The case 220 may include a mounting groove 227 mounted with the electrode assembly 210, an upper flange 221 extended in the side direction on the upper portion of the mounting groove 227, and a lower flange 223 extended in the side direction on the bottom of the mounting groove 227. The mounting groove 227 may be made of a structure that is opened upward.

The gasket 235 may be contacted with the upper surface of the upper flange 221, and may be continuously formed according to the upper flange 221, and an inner short portion thereof may be curved and inserted in the mounting groove 227.

Coupling holes 235a and 223a through which a fixing member 250 is passed through may be formed in the upper flange 221, the lower flange 223, and the gasket 235. The cases 220 of the rechargeable batteries 230 may be disposed and arranged, and the upper flange 221 and the lower flange 223 of the neighboring rechargeable battery 230 are disposed via the gasket 235 therebetween. Also, a spacer 231 supporting the upper flange 221 and the lower flange 223 may be installed between the upper flange 221 and the lower flange 223, and the spacer 231 may have a hollow structure for the fixing member 250 to be passed through.

The fixing member 250 may pass through the upper flange 221, the lower flange 223, the gasket 235, the spacer 231, and the end plates 241 and 242, thereby pressing the rechargeable batteries 230. The fixing member 250 according to the present embodiment may be made of the same structure as that of the fixing member of the previous embodiment such that a detailed description is omitted.

According to the present embodiment, the upper flange 221 and the lower flange 223 of the neighboring rechargeable battery 230 are close to each other via the gasket 235 interposed therebetween, such that the rechargeable batteries 230 are stably closed and sealed and the coupling and assembly of the battery module 200 are easy.

Figure 9:
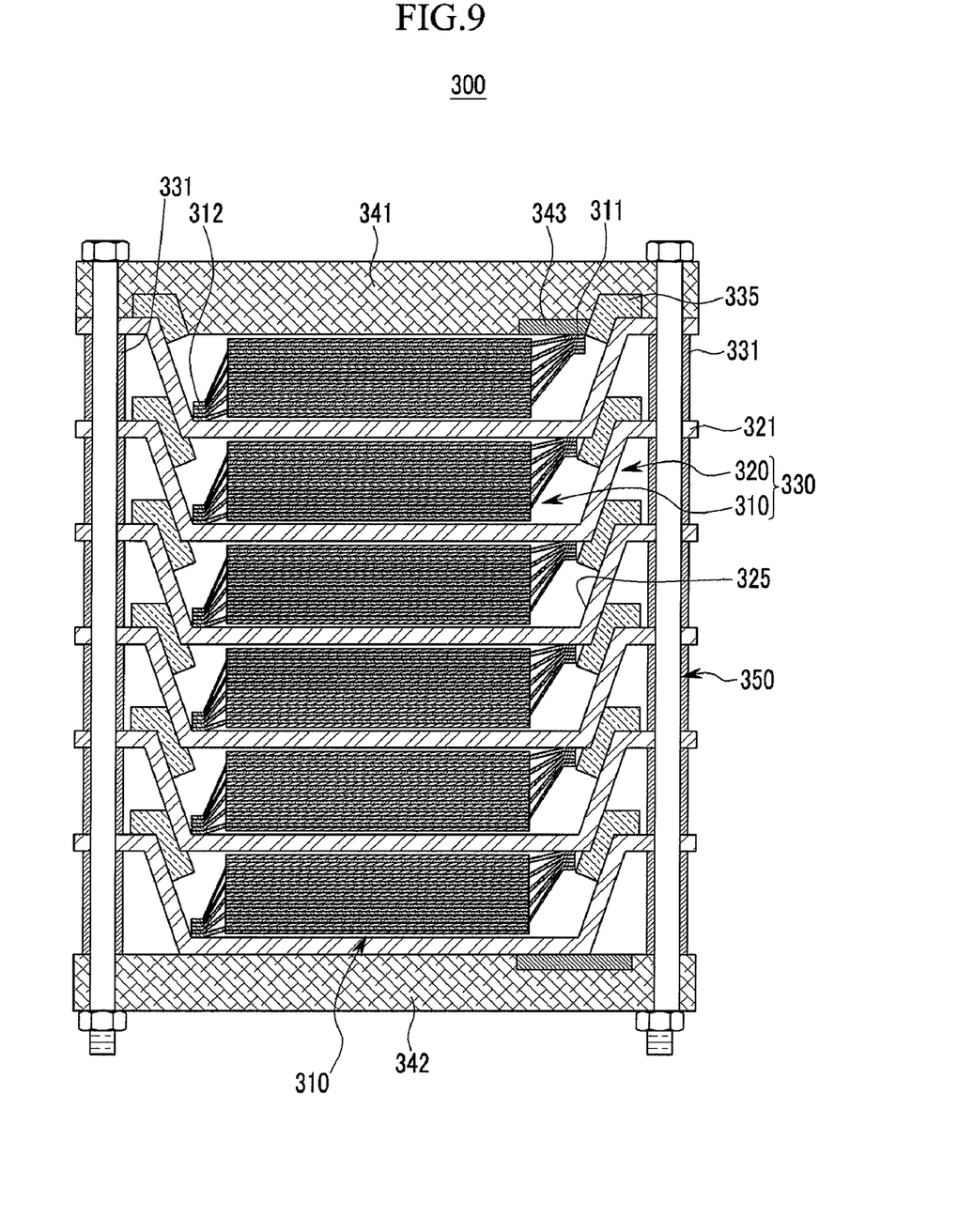
FIG. 9 is a cross-sectional view of a battery module according to a third embodiment of the present invention.

FIG. 9 is a cross-sectional view of a battery module according to a third embodiment of the present invention.

Referring to FIG. 9, a battery module 300 according to the present embodiment includes a plurality of rechargeable batteries 330 including a case 320 and a electrode assembly 310 inserted in the case 320, a gasket 335 interposed between the rechargeable batteries 330, end plates 341 and 342 installed at the outermost side of the rechargeable batteries 330 that are disposed and arranged, and a fixing member 350 passing through the case 320 and the end plates 341 and 342.

The electrode assembly 310 may have a plurality of anodes 311 and cathodes 312 deposited via a separator interposed therebetween, and an uncoated region at which an active material is not formed in the anode and the cathode may be respectively formed at the end on the opposite side to the electrode assembly.

The cathode 312 may be electrically connected to the bottom inside surface of the case 320, and the anode 311 may be electrically connected to the bottom outside surface of the neighboring case 320. In the present embodiment, the anode 311 and the cathode 312 may be directly adhered to the case 320 through welding, however the present invention is not limited thereto, and the anode 311 and the cathode 312 may be adhered to the case 320 by using a lead tap as a medium.

In the present embodiment, the anode 311 or the cathode 312 may be electrically connected to the case 320 such that the rechargeable batteries 330 may be coupled in series through the deposition of the case 320.

The case 320 may include a mounting groove 325 mounted with the electrode assembly 310, and an upper flange 321 extended in the side direction at the upper portion of the mounting groove 325. The mounting groove 325 may have a structure that is opened upward. The cross-section of the mounting groove 325 may be gradually decreased toward the bottom such that the opening is wider than at the bottom. Accordingly, the vertical section of the mounting groove 325 may have a trapezoidal shape, and when the case 320 is disposed and arranged, the bottom of the mounting groove 325 of the case 320 of one side is inserted to the mounting groove 325 of the case 320 of the other side.

The gasket 335 may be installed between the mounting grooves 325, and the cases may be further close as the mounting groove 325 that is disposed at the upper portion is moved downward. The gasket 335 may close and seal the space between the cases 320 and insulates the space between the cases 320.

The upper flange 321 may have a coupling hole in which the fixing member 350 is inserted, and the fixing member 350 may pass through the end plates 341 and 342 that are installed at the outermost part of the battery module 300 to be coupled.

Further, a spacer 331 supporting the upper flanges 321 may be formed between the upper flanges 321 of the rechargeable battery 330, and the spacer 331 may have a hollow structure for the fixing member 350 to be inserted.

The end plate 341 that is disposed uppermost may have a tab 343 to which the anode is adhered through welding, and the end plate 342 that is disposed lowermost may have a tab 343 to which the cathode is adhered through welding. Accordingly, the current may be transmitted outside through the end plates 341 and 342.

Figure 10:
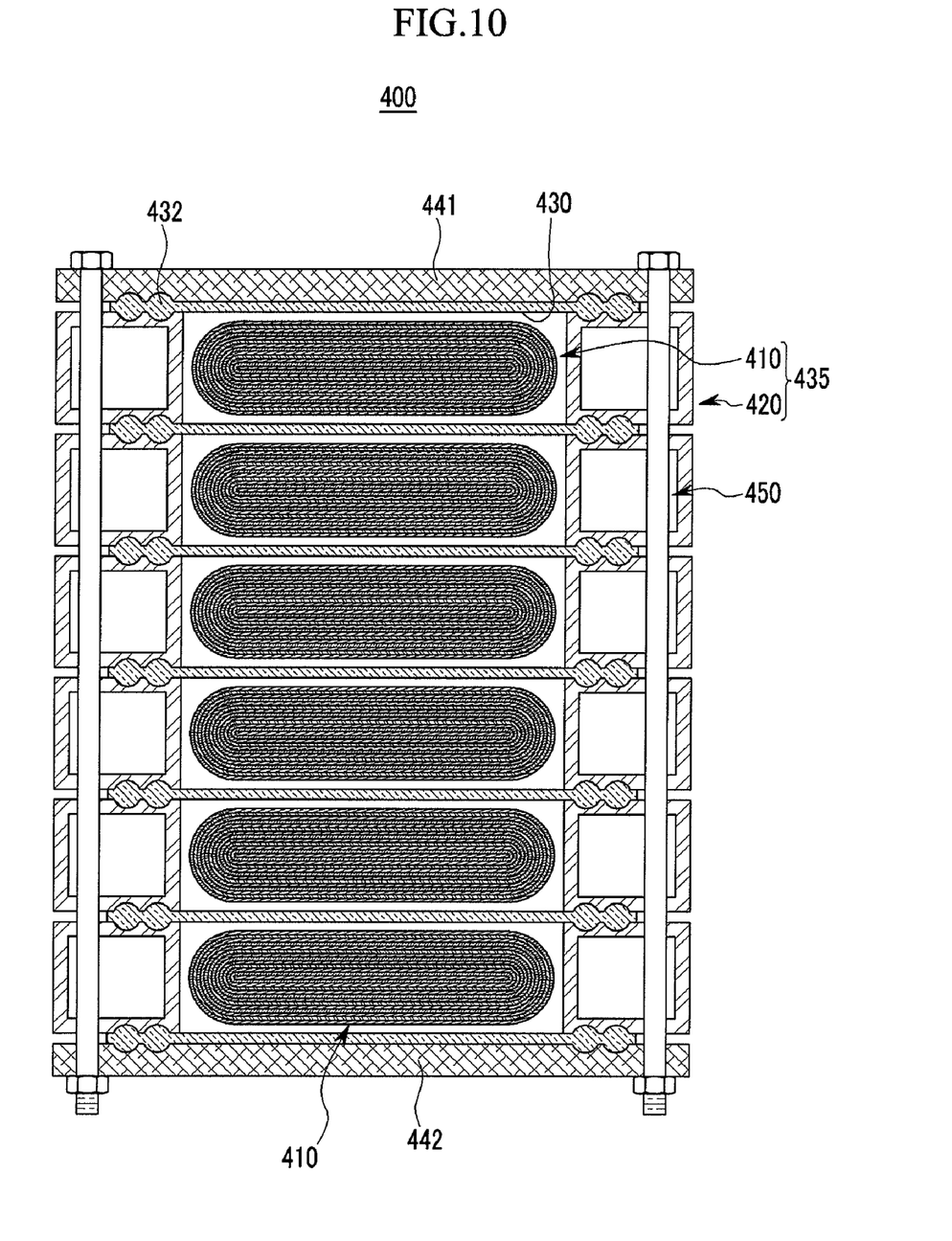
FIG. 10 is a cross-sectional view of a battery module according to a fourth embodiment of the present invention.
Figure 11:
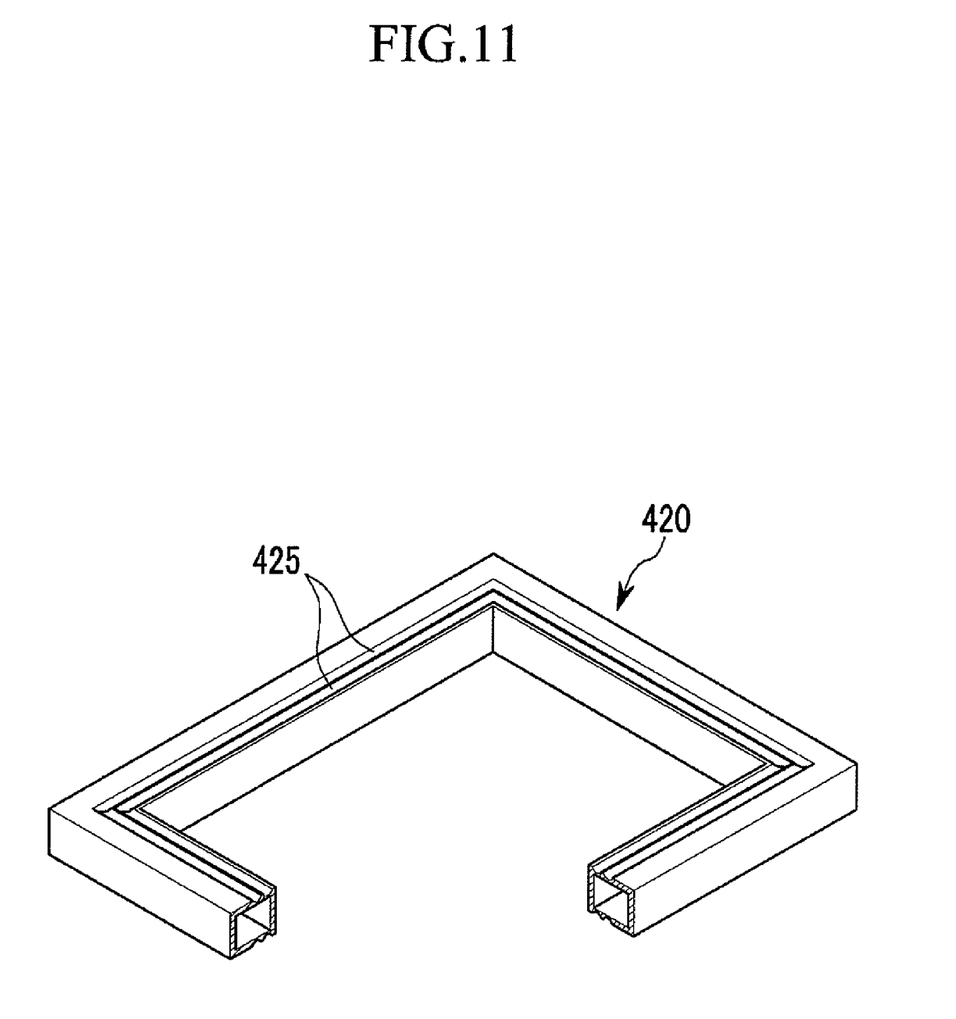
FIG. 11 is a cut-away perspective view of a case according to the fourth embodiment of the present invention.

FIG. 10 is a cross-sectional view of a battery module according to a fourth embodiment of the present invention, and FIG. 11 is a cut-away perspective view of a case according to the fourth embodiment of the present invention.

Referring to FIG. 10, a battery module 400 according to the present embodiment includes a plurality of rechargeable batteries 435 including a case 420 and an electrode assembly 410 inserted in the case 420, a gasket 430 interposed between the rechargeable batteries 435, end plates 441 and 442 installed at the outermost side of the rechargeable batteries 435 that are disposed and arranged, and a fixing member 450 passing through the case 420 and the end plates 441 and 442.

The electrode assembly 410 may be formed by being rolled after inserting the separator between the anode and the cathode, and inserted and disposed to the space formed in the central part of the case 420.

The case 420 may be opened upwardly and downwardly, thereby forming an approximate square ring shape. The case 420 may be formed by continuously connecting the hollow shape bars having a space formed thereinside, and coolant may be supplied through the space to cool the case 420. Accordingly, gas generated inside the case 420 may be quickly released outside. The upper and lower surfaces of the case 420 may have a groove 425 where a protrusion 432 of the gasket 430 is inserted.

The gasket 430 may be disposed between the cases 420 to close and seal them, thereby forming the square plate shape. The protrusions 432 connected in the circumference direction of the gasket 430 may be formed at the edges of the upper and lower surfaces of the gasket 430. Two protrusions 432 may be formed at the upper and lower surfaces of the gasket 430, and the two protrusions 432 may be disposed parallel to each other.

The protrusions 432 may be inserted in the grooves 425 of the cases 420, and when pressed by the fixing member 450, the case and the gasket are close to each other thereby closing and sealing the case.

While this disclosure has been described in connection with what is presently considered to be practical

What is claimed is:

1. A battery module comprising:
 a plurality of rechargeable batteries, each rechargeable battery including:
  a case having a mounting groove and an opening at one side with an upper flange extended outside of the opening, wherein the upper flange has a coupling hole in which a fixing member is inserted, and
  an electrode assembly inserted inside the case and on the mounting groove; and
 a sealing layer disposed between the opening of at least one case and the case of a neighboring rechargeable battery,
 wherein the opening of the at least one case is covered by the case of the neighboring rechargeable battery,
 wherein an upper flange of the at least one case contacts the case of the neighboring rechargeable battery, and
 wherein the fixing member supports the neighboring rechargeable battery.

2. The battery module of claim 1, further comprising a spacer between the upper flanges of the neighboring rechargeable batteries and supported by the fixing member between the upper flanges of the neighboring rechargeable batteries.

3. The battery module of claim 2, wherein the spacer is made of an elastic material.

4. The battery module of claim 1, wherein the upper flange has a step in which the sealing layer is inserted at a portion contacting the mounting groove.

5. The battery module of claim 4, wherein the case has a lower flange inserted at the step formed at the case of the neighboring rechargeable battery and contacting the sealing layer.

6. The battery module of claim 4, wherein the sealing layer is made of a gasket.

7. The battery module of claim 6, wherein the gasket has one cross-section selected from a circular, a quadrangular, and a wrinkle shape.

8. The battery module of claim 6, wherein the gasket has a hollow cross-section.

9. The battery module of claim 6, wherein at least one surface of the gasket has a protrusion.

10. The battery module of claim 6, wherein the gasket includes a supporting member and a polymer layer coated on a surface of the supporting member, and the gasket is more elastic than the supporting member.

11. The battery module of claim 1, wherein the mounting groove is inclined so that a bottom of the mounting groove has a surface area that is smaller than a surface area of the opening, and the sealing layer is formed between an opening of the mounting groove and an outer surface of a mounting groove of a neighboring case.

12. The battery module of claim 11, wherein the bottom of the mounting groove is inserted into a mounting groove of a neighboring rechargeable battery.

13. The battery module of claim 1, wherein
 the electrode assembly includes an anode and a cathode and a separator disposed between the anode and the cathode, and
 one electrode of the anode and the cathode is electrically connected to a bottom of the case and the other electrode is electrically connected to a lower surface of a neighboring case.

14. A battery module comprising:
 a plurality of rechargeable batteries, each rechargeable battery including a case having an opening formed on opposite surfaces facing each other, and an electrode assembly inserted into the case, wherein the case is made of a hollow bar with a space inside; and
 a plurality of gasket members inserted between adjacent cases and covering the opening of each of the rechargeable batteries.

15. The battery module of claim 14, wherein a coolant is supplied into the space inside of the hollow bar.

16. The battery module of claim 14, wherein each gasket member has a protrusion formed at an edge, and each case has a groove on a surface of the case in which the protrusion of the gasket is inserted.

* * * * *